US011272575B1

(12) United States Patent
Sevindik

(10) Patent No.: US 11,272,575 B1
(45) Date of Patent: Mar. 8, 2022

(54) BANDWIDTH MANAGEMENT FOR DOUBLE-RADIO USER EQUIPMENT

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/088,036

(22) Filed: Nov. 3, 2020

(51) Int. Cl.
| | |
|---|---|
| *H04W 88/06* | (2009.01) |
| *H04W 16/14* | (2009.01) |
| *H04W 28/02* | (2009.01) |
| *H04W 8/22* | (2009.01) |
| *H04W 8/18* | (2009.01) |

(52) U.S. Cl.
CPC ............ *H04W 88/06* (2013.01); *H04W 8/183* (2013.01); *H04W 8/22* (2013.01); *H04W 16/14* (2013.01); *H04W 28/0268* (2013.01)

(58) Field of Classification Search
CPC ....... H04W 88/06; H04W 8/22; H04W 16/14; H04W 28/0268
See application file for complete search history.

(56) References Cited

U.S. PATENT DOCUMENTS

| 10,623,943 B1 | 4/2020 | Sevindik et al. |
| 2010/0141762 A1* | 6/2010 | Siann ............... H04N 5/232411 348/143 |
| 2016/0219608 A1* | 7/2016 | Awoniyi-Oteri ............... H04W 72/1215 |
| 2017/0374557 A1* | 12/2017 | Mueck ................ H04L 27/2655 |
| 2018/0049213 A1* | 2/2018 | Gholmieh ......... H04W 72/1215 |
| 2020/0084780 A1 | 3/2020 | Wiatrowski et al. |
| 2020/0329523 A1* | 10/2020 | Yi ...................... H04W 72/0453 |
| 2020/0351818 A1* | 11/2020 | Park ....................... H04W 4/90 |

OTHER PUBLICATIONS

International Search Report and Written Opinion for corresponding International application No. PCT/US2021/054926 dated Jan. 14, 2022 (13 pages).

* cited by examiner

*Primary Examiner* — Barry W Taylor
(74) *Attorney, Agent, or Firm* — Mendelsohn Dunleavy, P.C.; Steve Mendelsohn

(57) ABSTRACT

A first radio of a wireless, e.g., dual-SIM DSDS, device communicates wirelessly with a first, e.g., 5G CBSD, base station of a first service provider using a first spectrum type, e.g., PAL or high- or low-bandwidth GAA, while a second radio communicates wirelessly with a second, e.g., 5G non-CBSD gNB, base station of a second service provider using a second spectrum type. The first radio informs the second radio of the first spectrum type assigned to the first radio, and the second radio transmits, to the second base station, capability information for the second radio based on the first spectrum type, that capability information being used by the second base station in assigning the second spectrum type to the second base station, thereby enabling equivalent QoS to be rendered to both radios even when the first service provider cannot directly control the QoS provided by the second service provider.

18 Claims, 2 Drawing Sheets

BANDWIDTH MANAGEMENT FOR DOUBLE-RADIO USER EQUIPMENT

BACKGROUND

Field of the Disclosure

The present disclosure relates to wireless communications and, more specifically but not exclusively, to user equipment having two radios capable of concurrent wireless communication with the base stations of two different 5G service providers.

Description of the Related Art

This section introduces aspects that may help facilitate a better understanding of the disclosure. Accordingly, the statements of this section are to be read in this light and are not to be understood as admissions about what is prior art or what is not prior art.

A dual-SIM, dual-subscription (DSDS) device is a wireless UE (user equipment) that has two Subscriber Identification Module (SIM) cards that enable the device to communicate with the base stations of two different service providers. There are two different types of DSDS devices: single-radio DSDS devices and double-radio DSDS devices.

A single-radio DSDS device has two SIM cards, but only one radio. A single-radio DSDS device can communicate with the base stations of two different service providers, but not both service providers at the same time. In particular, a single-radio DSDS device can either (i) use its first SIM card to communicate with the base stations of a first service provider or (ii) use its second SIM card to communicate with the base stations of a different, second service provider, but not both service providers at the same time.

A double-radio DSDS device, on the other hand, has two SIM cards and two radios. A double-radio DSDS device can communicate with the base stations of two different service providers, either one service provider at a time or both service providers at the same time. In particular, at any given time, a double-radio DSDS device can (i) use its first SIM card to communicate with the base stations of a first service provider or (ii) use its second SIM card to communicate with the base stations of a different, second service provider or (iii) both.

SUMMARY

For a given coverage area serviced by two different service providers, a first service provider may purchase bandwidth from a second service provider. For example, both service providers may have base stations in the same coverage area, but the bandwidth of the base stations of the first service provider might not be sufficient to serve all of the needs of the customers of the first service provider. In that case, the first service provider may purchase additional bandwidth from the second service provider to augment the first service provider's own bandwidth in order to support the bandwidth needs of the first service provider's customers.

Assume that (i) a particular customer of the first service provider has a double-radio DSDS device and that (ii) the customer would like to use the double-radio DSDS device to watch a football game while discussing the game on a phone call with a friend, but that (iii) the first service provider is unable to provide all of the bandwidth needed for both the football game and the phone call and (iv) the second service provider has sufficient bandwidth available to augment the bandwidth of the first service provider. In that case, the double-radio DSDS device can be used to stream the football game using one of the two radios while using the other radio for the phone call. Since the first service provider will typically pay the second service provider based on the amount of bandwidth purchased by the first service provider from the second service provider, the first service provider wants to rent as little bandwidth as possible from the second service provider to keep its costs down. In this example, since streaming the football game requires more bandwidth than the phone call, whenever possible, the first service provider would prefer that the double-radio DSDS device uses (i) the first service provider's base stations for the football game and (ii) the base stations of the second service provider for the phone call.

In addition, in order to keep its customers happy, the first service provider would like the quality of service (QoS) received by its customer from the second service provider to be at least approximately equivalent to the QoS received by the customers from the first service provider.

Assuming, as is typical, that the first service provider is unable to directly control the amount of bandwidth allocated by the second service provider to the double-radio DSDS device of the first service provider's customer, as described further below, a first radio of the double-radio DSDS device (which first radio is associated with the first service provider) is configured to communicate certain information internally to the device's second radio (which is associated with the second service provider). The second radio uses that information to request bandwidth from a base station of the second service provider, thereby providing the first service provider with the ability to attempt to indirectly control the amount of bandwidth allocated by the second service provider to the second radio of the double-radio DSDS device.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains,"

"containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
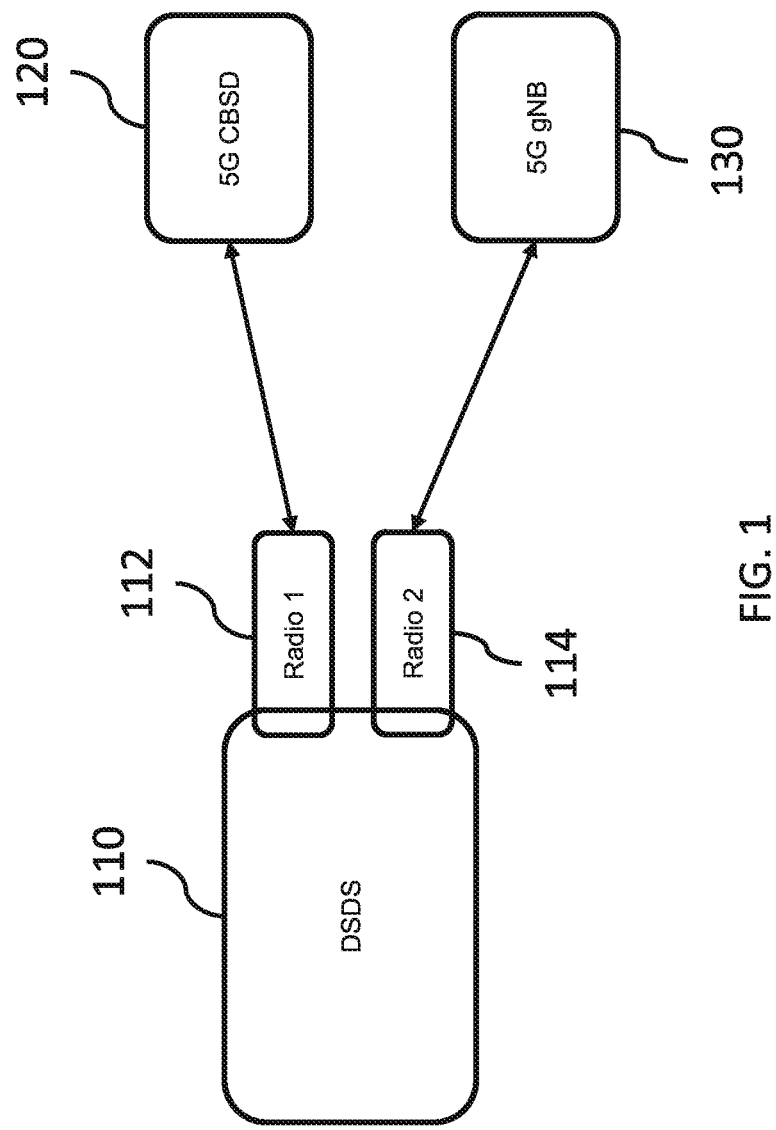
FIG. 1 is a block diagram of a double-radio DSDS device according to certain embodiments of the disclosure.

FIG. 1 is a block diagram of a double-radio DSDS device 110 according to certain embodiments of the disclosure having (i) a first radio 112 configured to communicate with the 5G Citizens Broadband Radio Service (CBRS) base stations (CBSDs) 120 of a first service provider and (i) a second radio 114 configured to communicate with the 5G non-CBRS gNodeB base stations (gNBs) 130 of a different, second service provider.

Figure 2:
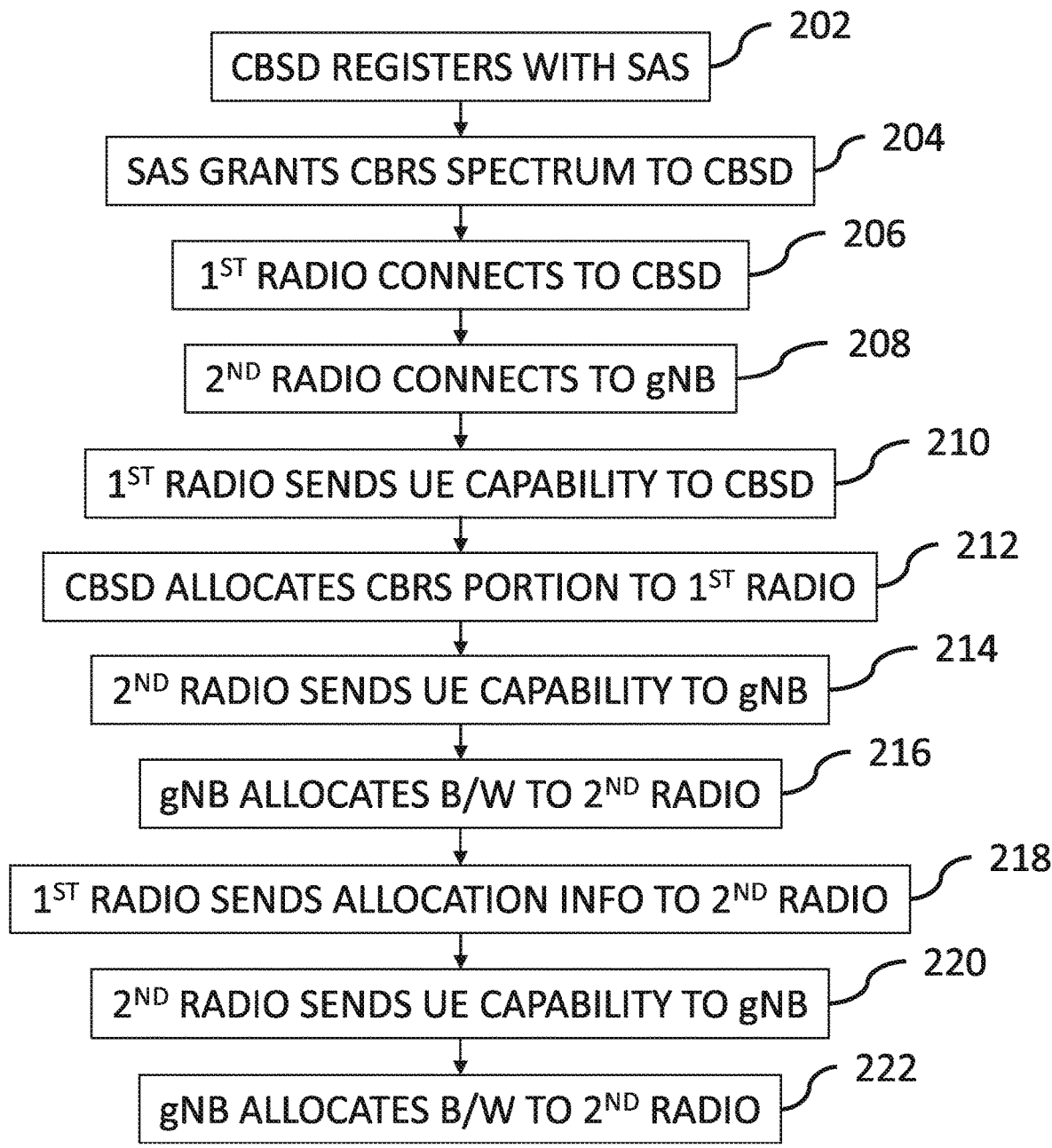
FIG. 2 is a flow diagram of the processing performed by the first and second radios of the double-radio DSDS device and the CBSD and gNB base stations of FIG. 1, according to one possible scenario for one possible embodiment of the disclosure.

FIG. 2 is a flow diagram of the processing performed by the first and second radios 112 and 114 of the double-radio DSDS device 110 and the CBSD and gNB base stations 120 and 130 of FIG. 1, according to one possible scenario for one possible embodiment of the disclosure. In this scenario, a new CBSD base station 120 is added to the same coverage area as an already-existing gNB base station 130. According to this scenario, the first service provider needs to buy bandwidth from the second service provider in order to satisfy the bandwidth needs of the double-radio device 110.

The processing of FIG. 2 begins at step 202 with the CBSD base station 120 registering with the Spectrum Access System (SAS) (not shown in FIG. 1) responsible for allocating bandwidth to the base stations within the coverage area. In particular, the SAS allocates bandwidth to and, if necessary, de-allocates bandwidth from the different base stations in the coverage area to balance the competing goals of allocating high bandwidths to individual base stations while limiting interference associated with those base stations.

In step 204, the SAS grants the 150-MHz CBRS spectrum, which is a subset of the overall 3.5-GHz 5G frequency band, to the CBSD base station 120. The CBSD base station 120 is able to divvy up the CBRS spectrum among the different UEs owned by the customers of the first service provider. For example, the CBSD base station 120 may assign a Priority Access License (PAL) for a particular portion of the CBRS spectrum to the wireless device of a particular one of its customers, with the remainder of the CBRS spectrum being divvied up among the first service provider's other customers as General Authorization Access (GAA) portions, potentially of different bandwidths. For example, in one possible scenario, the 150-MHz CBRS spectrum is divvied up as follows: 50 MHz for a PAL license with the remaining 100 MHz divvied up into four GAA portions: three 30-MHz high-bandwidth GAA portions and a single 10-MHz low-bandwidth GAA portion. Note that a given coverage area need not have a PAL licensee and may instead have only GAA users.

In step 206, the first radio 112 establishes a connection with the CBSD base station 120 using some of the CBRS spectrum granted to the CBSD base station 120 in step 204, and, in step 208, the second radio 114 establishes a connection with the gNB base station 130 using some of the non-CBRS spectrum previously acquired by the second service provider.

In step 210, the first radio 112 sends user equipment (UE) capability information about the first radio 112 (e.g., high or low bandwidth) to the CBSD base station 120 and, in step 212, the CBSD base station 120 uses that EU capability information for the first radio 112 to allocate either a PAL portion, a high-bandwidth GAA portion, or a low-bandwidth GAA portion of the CBRS spectrum to the first radio 112.

In step 214, the second radio 114 sends UE capability information about the second radio 114 to the gNB base station 130 and, in step 216, the gNB base station 130 uses that EU capability information for the second radio 114 to allocate either high or low bandwidth to the second radio 114.

In step 218, the first radio 112 sends, to the second radio 114, information about (i) the amount of bandwidth and (ii) the type of bandwidth (i.e., PAL or GAA) allocated by the CBSD base station 120 to the first radio 112.

In step 220, the second radio 114 sends, to the first radio 112, information about the amount of bandwidth allocated by the gNB base station 130 to the second radio 114. The first radio 112 uses this information to determine the speed at which data is transmitted from the gNB base station 130 to the second radio 114, which in turn indicates the QoS of that service.

In step 222, the second radio 114 uses the information received from the first radio 112 in step 218 to determine whether to change the UE capability information transmitted by the second radio 114 to the gNB base station 130. In particular, if the first radio 112 is assigned a high-bandwidth (e.g., an amount of bandwidth above some specified threshold) GAA portion of the CBRS spectrum, then the second radio 114 requests (via the re-transmission of possibly updated UE capability information) equivalent high bandwidth from the gNB base station 130. If, however, the first radio 112 is assigned a low-bandwidth (e.g., an amount of bandwidth below the specified threshold) GAA portion of the CBRS spectrum, then the second radio 114 requests (via the re-transmission of possibly updated UE capability information) equivalent low bandwidth from the gNB base station 130. If the first radio 112 is assigned a PAL portion of the CBRS spectrum, then the second radio 114 requests (via the re-transmission of possibly updated UE capability information) equivalent high bandwidth from the gNB base station 130. In this way, assuming that the gNB base station 130 grants the requested bandwidth level, the QoS of the service received by the second radio 114 will be approximately the same as the QoS of the service received by the first radio 112.

If and when the CBSD base station 120 gets powered down by the SAS due to interference issues, then the first radio 112 will inform the second radio 114 that the first radio 112 is not receiving service from the first service provider, and the second radio 114 will then transmit a request for low bandwidth to the gNB base station 130 to reduce the cost paid by the first service provider to the second service provider.

Note that the processing of steps 210-222 gets repeated regularly while the double-radio device 110 is communicating with both base stations 120 and 130.

Note further that, in other possible embodiments of the disclosure, the above-described steps can occur in different sequences. For example, steps 206 and 208 can be reversed. Similarly, steps 210 and 212 can be reversed with steps 214 and 216. Other variations are also possible.

Although the disclosure has been described in the context of a first service provider providing 5G CBRS service and a second service provider providing 5G non-CBRS service, those skilled in the art will understand that the disclosure can also be implemented in the context of other types of service providers providing other types of 5G service and/or non-5G service.

In certain embodiments, the present disclosure is a wireless device comprising (i) a first radio configured to communicate wirelessly with a first base station of a first service provider using a first spectrum type assigned by the first base station and (ii) a second radio configured to communicate wirelessly with a second base station of a second service provider using a second spectrum type assigned by the second base station, wherein (i) the second service provider is different from the first service provider and (ii) the second spectrum type may be different from or same as the first spectrum type. The first radio is configured to inform the second radio of the first spectrum type assigned to the first radio, and the second radio is configured to transmit, to the second base station, capability information for the second radio based on the first spectrum type assigned to the first radio, the capability information for the second radio being used by the second base station in assigning the second spectrum type to the second base station.

In at least some of the above embodiments, the wireless device is a dual-SIM, dual-subscription (DSDS) device.

In at least some of the above embodiments, the first and second base stations are 5G base stations.

In at least some of the above embodiments, the first base station is a Citizens Broadband Radio Service base station (CBSD); and the second base station is not a CBSD.

In at least some of the above embodiments, if the first spectrum type for first radio is a high-bandwidth spectrum type, then the second radio selects the capability information for the second radio to cause the second base station to assign a high-bandwidth spectrum type as the second spectrum type for the second radio; and, if the first spectrum type for first radio is a low-bandwidth spectrum type, then the second radio selects the capability information for the second radio to cause the second base station to assign a low-bandwidth spectrum type as the second spectrum type for the second radio.

In at least some of the above embodiments, the first spectrum type for first radio is a General Authorization Access (GAA) spectrum.

In at least some of the above embodiments, if the first spectrum type for first radio is a Priority Access License (PAL) spectrum, then the second radio selects the capability information for the second radio to cause the second base station to assign a high-bandwidth spectrum type as the second spectrum type for the second radio.

In at least some of the above embodiments, if the first base station is powered down because of interference issues, then the second radio selects the capability information for the second radio to cause the second base station to assign a low-bandwidth spectrum type as the second spectrum type for the second radio.

Functional modules or units may be composed of circuitry, where such circuitry may be fixed function, configurable under program control or under other configuration information, or some combination thereof. Functional modules themselves thus may be described by the functions that they perform, to helpfully abstract how some of the constituent portions of such functions may be implemented. In some situations, circuitry, units, and/or functional modules may be described partially in functional terms, and partially in structural terms. In some situations, the structural portion of such a description may be described in terms of a configuration applied to circuitry or to functional modules, or both.

Configurable circuitry is effectively circuitry or part of circuitry for each different operation that can be implemented by that circuitry, if configured to perform or otherwise interconnected to perform each different operation. Such configuration may come from or be based on instructions, microcode, one-time programming constructs, embedded memories storing configuration data, and so on. A unit or module for performing a function or functions refers, in some implementations, to a class or group of circuitry that implements the functions or functions attributed to that unit. Identification of circuitry performing one function does not mean that the same circuitry, or a portion thereof, cannot also perform other functions concurrently or serially.

Although circuitry or functional units may typically be implemented by electrical circuitry, and more particularly, by circuitry that primarily relies on transistors fabricated in a semiconductor, the disclosure is to be understood in relation to the technology being disclosed. For example, different physical processes may be used in circuitry implementing aspects of the disclosure, such as optical, nanotubes, micro-electrical mechanical elements, quantum switches or memory storage, magnetoresistive logic elements, and so on. Although a choice of technology used to construct circuitry or functional units according to the technology may change over time, this choice is an implementation decision to be made in accordance with the then-current state of technology.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, microcode, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A wireless device comprising:
   a first radio configured to communicate wirelessly with a first base station of a first service provider using an assigned first spectrum type received from the first base station; and
   a second radio configured to communicate wirelessly with a second base station of a second service provider using an assigned second spectrum type received from the second base station, wherein (i) the second service provider is different from the first service provider and (ii) the assigned second spectrum type may be different from or same as the assigned first spectrum type, wherein:
   the first radio is configured to inform the second radio of the assigned first spectrum type assigned to the first radio; and
   the second radio is configured to transmit, to the second base station, capability information for the second radio based on the assigned first spectrum type assigned to the first radio, wherein the assigned second spectrum type is based on the capability information for the second radio transmitted to the second base station.

2. The wireless device of claim 1, wherein the wireless device is a dual-SIM, dual-subscription (DSDS) device.

3. The wireless device of claim 1, wherein the first and second base stations are 5G base stations.

4. The wireless device of claim 3, wherein:
   the first base station is a Citizens Broadband Radio Service base station (CBSD); and
   the second base station is not a CBSD.

5. The wireless device of claim 1, wherein:
   if the assigned first spectrum type for the first radio is a high-bandwidth spectrum type, then the second radio selects the capability information for the second radio to receive from the second base station an assigned high-bandwidth spectrum type as the assigned second spectrum type for the second radio; and if the assigned first spectrum type for the first radio is a low-bandwidth spectrum type, then the second radio selects the capability information for the second radio to receive from the second base station an assigned a-low-bandwidth spectrum type as the assigned second spectrum type for the second radio.

6. The wireless device of claim 5, wherein the first spectrum type for the first radio is a General Authorization Access (GAA) spectrum.

7. The wireless device of claim 1, wherein, if the assigned first spectrum type for first radio is a Priority Access License (PAL) spectrum, then the second radio selects the capability information for the second radio to receive from the second base station an assigned high-bandwidth spectrum type as the assigned second spectrum type for the second radio.

8. The wireless device of claim 1, wherein, if the first radio determines that the first base station was powered down because of interference issues, then the second radio selects the capability information for the second radio to receive from the second base station an assigned low-bandwidth spectrum type as the second spectrum type for the second radio.

9. The wireless device of claim 1, wherein:
the wireless device is a dual-SIM DSDS device;
the first base station is a 5G CBSD;
the second base station is 5G non-CBSD;
if the assigned first spectrum type for first radio is a high-bandwidth GAA spectrum or a PAL spectrum, then the second radio selects the capability information for the second radio to receive from the second base station an assigned high-bandwidth spectrum type as the assigned second spectrum type for the second radio;
if the assigned first spectrum type for first radio is a low-bandwidth GAA spectrum, then the second radio selects the capability information for the second radio to receive from the second base station an assigned low-bandwidth spectrum type as the assigned second spectrum type for the second radio; and
if the first radio determines that the first base station was powered down because of interference issues, then the second radio selects the capability information for the second radio to receive from the second base station an assigned low-bandwidth spectrum type as the assigned second spectrum type for the second radio.

10. A method for a wireless device having first and second radios to communicate, respectively, with first and second base stations of first and second service providers, wherein the second service provider is different from the first service provider, the method comprising:
(a) the first radio communicating wirelessly with the first base station using an assigned first spectrum type received from the first base station;
(b) the first radio informing the second radio of the assigned first spectrum type received from the first radio;
(c) the second radio transmitting, to the second base station, capability information for the second radio based on the assigned first spectrum type assigned to the first radio, wherein the assigned second spectrum type is based on the capability information for the second radio being used by transmitted to the second base station; and
(d) the second radio communicating wirelessly with the second base station using the assigned second spectrum type, wherein the assigned second spectrum type may be different from or same as the assigned first spectrum type.

11. The method of claim 10, wherein the wireless device is a DSDS device.

12. The method of claim 10, wherein the first and second base stations are 5G base stations.

13. The method of claim 12, wherein:
the first base station is a CBSD; and
the second base station is not a CBSD.

14. The method of claim 10, wherein:
when the assigned first spectrum type for the first radio is a high-bandwidth spectrum type, then the second radio selects the capability information for the second radio to receive from the second base station an assigned high-bandwidth spectrum type as the assigned second spectrum type for the second radio; and
when the assigned first spectrum type for the first radio is a low-bandwidth spectrum type, then the second radio selects the capability information for the second radio to receive from the second base station an assigned low-bandwidth spectrum type as the assigned second spectrum type for the second radio.

15. The method of claim 14, wherein the first spectrum type for the first radio is a GAA spectrum.

16. The method of claim 10, wherein, when the assigned first spectrum type for first radio is a PAL spectrum, then the second radio selects the capability information for the second radio to receive from the second base station an assigned high-bandwidth spectrum type as the assigned second spectrum type for the second radio.

17. The method of claim 10, wherein, when the first radio determines that the first base station was powered down because of interference issues, then the second radio selects the capability information for the second radio to receive from the second base station an assigned low-bandwidth spectrum type as the assigned second spectrum type for the second radio.

18. The method of claim 10, wherein:
the wireless device is a dual-SIM DSDS device;
the first base station is a 5G CBSD;
the second base station is 5G non-CBSD;
if the assigned first spectrum type for first radio is a high-bandwidth GAA spectrum or a PAL spectrum, then the second radio selects the capability information for the second radio to receive from the second base station assigned high-bandwidth spectrum type as the assigned second spectrum type for the second radio;
if the assigned first spectrum type for first radio is a low-bandwidth GAA spectrum, then the second radio selects the capability information for the second radio to receive from the second base station an assigned low-bandwidth spectrum type as the assigned second spectrum type for the second radio; and
if the first radio determines that the first base station was powered down because of interference issues, then the second radio selects the capability information for the second radio to receive from the second base station an assigned low-bandwidth spectrum type as the assigned second spectrum type for the second radio.

\* \* \* \* \*

UNITED STATES PATENT AND TRADEMARK OFFICE
CERTIFICATE OF CORRECTION

PATENT NO. : 11,272,575 B1
APPLICATION NO. : 17/088036
DATED : March 8, 2022
INVENTOR(S) : Volkan Sevindik It is certified that error appears in the above-identified patent and that said Letters Patent is hereby corrected as shown below:

In the Claims

In Claim 5, delete "a" before --low-bandwidth spectrum type as the assigned second spectrum type for the second radio--.

In Claim 10, replace "(b) the first radio informing the second radio of the assigned first spectrum type received from the first radio;" with --(b) the first radio informing the second radio of the assigned first spectrum type received from the first base station;--.

In Claim 10, replace "(c) the second radio transmitting, to the second base station, capability information for the second radio based on the assigned first spectrum type assigned to the first radio, wherein the assigned second spectrum type is based on the capability information for the second radio being used by transmitted to the second base station; and" with --(c) the second radio transmitting, to the second base station, capability information for the second radio based on the assigned first spectrum type assigned to the first radio, wherein the assigned second spectrum type is based on the capability information for the second radio transmitted to the second base station; and--.

Signed and Sealed this
Twenty-eighth Day of June, 2022

Katherine Kelly Vidal
*Director of the United States Patent and Trademark Office*